SWIFT & STANDISH.
Grain Separator.
No. 109,155. Patented Nov. 8, 1870.
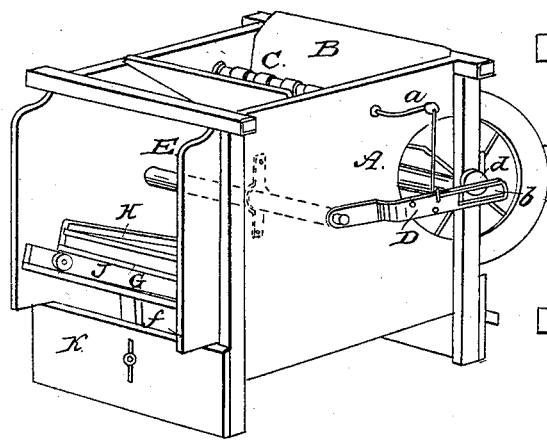
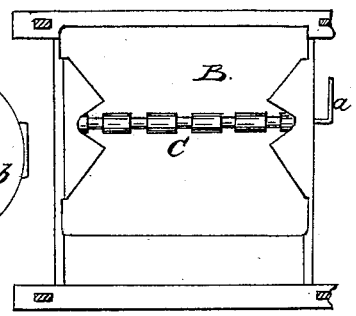
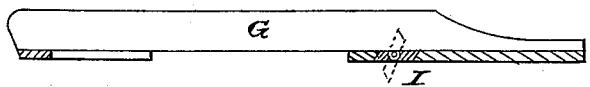
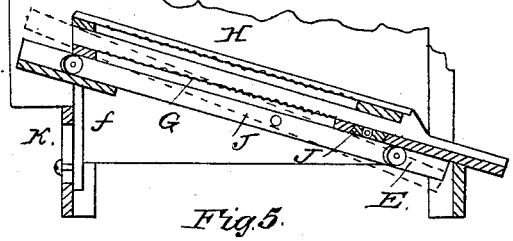
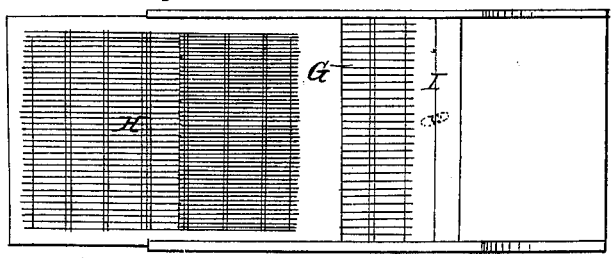
Witnesses
C. L. Evert
A. H. Marp
Inventor
F. Swift & W. Standish
per Alexander & Mason
attys

UNITED STATES PATENT OFFICE.

FRANK SWIFT AND MILES STANDISH, OF HUDSON, MICHIGAN.

IMPROVEMENT IN GRAIN-SEPARATORS.

Specification forming part of Letters Patent No. 109,155, dated November 8, 1870.

*To all whom it may concern:*

Be it known that we, FRANK SWIFT and MILES STANDISH, of Hudson, in the county of Lenawee, and in the State of Michigan, have invented certain new and useful Improvements in Grain-Separators; and do hereby declare that the following is a full, clear, and exact description thereof, reference being had to the accompanying drawing, and to the letters of reference marked thereon, making a part of this specification.

The nature of our invention consists, first, in a vibrating feeder or bar running horizontally through the bottom of the hopper; second, in the device for operating said vibrating feeder or bar; third, in a double screen in the lower part of the mill in connection with a trap-door at the bottom of the lower screen; and, fourth, in the device for adjusting the screens at any angle desired.

In order to enable others skilled in the art to which our invention appertains to make and use the same, we will now proceed to describe its construction and operation, referring to the annexed drawing, in which—

Figure 1 is a perspective view of our entire grain-separator. Fig. 2 is a plan view of the hopper, showing the vibrating feeder. Fig. 3 is a longitudinal vertical section, showing the device for adjusting the screens at any angle desired. Fig. 4 is a longitudinal vertical section of the lower screen, showing the trap-door in the same, and Fig. 5 is a plan view of the double screen with the trap-door.

A represents the frame of our separator, in the upper part of which is the hopper B. Through the bottom of the hopper runs horizontally a round bar, C, which is cut square at suitable intervals on its upper side, as shown in Fig. 2. This bar is operated by a shaft, *a*, connected with a slotted bar, D, on the outside of the separator.

The bar D is secured on the end of a shaft, E, which passes through the frame A, and connected with the screens in any suitable manner, so that by the motion of the bar D the screens will receive their necessary motion.

The slotted portion of the bar D is placed over a friction-roller, *b*, on the crank *d* upon the end of the fan-shaft, so that by the motion of the fan this end of said bar will move up and down. By this movement of the bar D the horizontal bar C obtains a vibrating motion, which causes the grain to flow or discharge in a continuous sheet the whole width of the hopper without liability to clog, as the grain at the bottom of the hopper is kept in continual motion by the vibrations of said bar or feeder C.

The friction-roller *b* removes much of the friction arising from the working of the wrist of the crank *d* in the slotted bar D.

G represents the lower screen, above which in the same frame is placed another screen, H, and in the said lower screen is a trap-door, I, as shown in Figs. 4 and 5.

The advantages for this double screen are, that it divides the weight of grain on the screens and gives double the screening-surface, and prevents a depression of the center of the screens by weight.

The double screen also enables the operator to separate at will the larger grain from the smaller seed by opening the trap-door I at the bottom of the lower screen, and by closing the same to intermingle them.

The double screen G H rests upon friction-rollers *e e*, placed on two bars, J J, which are hung at or near their center on the inside of the frame A, and made adjustable by means of an upright bar, *f*, attached to the tail-board K by a screw, which passes through a vertical slot in said tail-board.

The bars J J, being hung or pivoted at or near their center, can be set at any angle without interfering with other parts of the mill, or at least the limit of their motion is far greater than if the bars are pivoted near their ends. The rollers *e e*, being placed on said bars, require no moving, at whatever angle the screen may be placed.

Having thus fully described our invention, what we claim as new, and desire to secure by Letters Patent, is—

1. The vibrating bar C, provided with alternate square and round spaces, placed in the hopper-bottom, and operated by the crank d, roller b, slotted bar D, and shaft a, all substantially as set forth.

2. The combination and arrangement of the screen G H, trap-door I, rollers e, upright post f, slotted board K, and bars J J, all substantially as set forth.

3. The bars J J, pivoted at or near their center, provided with the rollers e e, and made adjustable by means of the upright post f, which is attached at any height desired on the slotted tail-board K, substantially as and for the purposes herein set forth.

In testimony that we claim the foregoing we have hereunto set our hands this 12th day of August, 1870.

FRANK SWIFT.
MILES STANDISH.

Witnesses:
SETH BEAN,
G. I. THOMPSON.